United States Patent [19]

Prodel et al.

[11] Patent Number: 4,646,245

[45] Date of Patent: Feb. 24, 1987

[54] MODULAR INSTALLATION FOR ASSEMBLING AND/OR MACHINING PARTS, WITH WORK STATIONS INCLUDING KEYBOARD-DISPLAY DEVICES

[76] Inventors: Maurice Prodel, 153, rue de Verdun - Carlepont; Jacques Prodel, 120, rue de Cuts - Carlepont, both of 60170 Ribecourt, France

[21] Appl. No.: 621,479

[22] Filed: Jun. 18, 1984

[30] Foreign Application Priority Data

Jun. 17, 1983 [FR] France .............................. 83 10059

[51] Int. Cl.$^4$ .............................................. G06F 15/46
[52] U.S. Cl. .................................. 364/468; 364/478; 198/349; 198/358
[58] Field of Search ................ 364/468, 478; 198/301, 198/349, 356, 358

[56] References Cited

U.S. PATENT DOCUMENTS

| | | | |
|---|---|---|---|
| 3,576,540 | 4/1971 | Fair ..................................... | 364/200 |
| 3,803,556 | 4/1974 | Duffy ................................ | 198/349 |
| 4,472,783 | 9/1984 | Johnstone ......................... | 364/468 |
| 4,513,854 | 4/1985 | Prodel et al. ..................... | 198/605 |
| 4,519,491 | 5/1985 | Prodel et al. ..................... | 198/580 |

Primary Examiner—Jerry Smith
Assistant Examiner—Allen MacDonald
Attorney, Agent, or Firm—Sandler & Greenblum

[57] ABSTRACT

Work stations (PM1 to PM3, PA, PB) are connected in series or in parallel in a closed loop main conveyor circuit (CC), thereby constituting a modular "flexible workshop" type of installation. Each work station (e.g. PM1) includes an upstream read means (L11) and a write means (E12) for co-operating with a modifiable destination code incorporated in each pallet conveyed by the system. Each work station has a local data processor unit (UM1) associated with a keyboard-display device. The keyboard-display devices greatly facilitate setting up the modular installation whenever it is changed around, and also provide continuous monitoring of installation operation, including the work done by specific operators.

13 Claims, 15 Drawing Figures

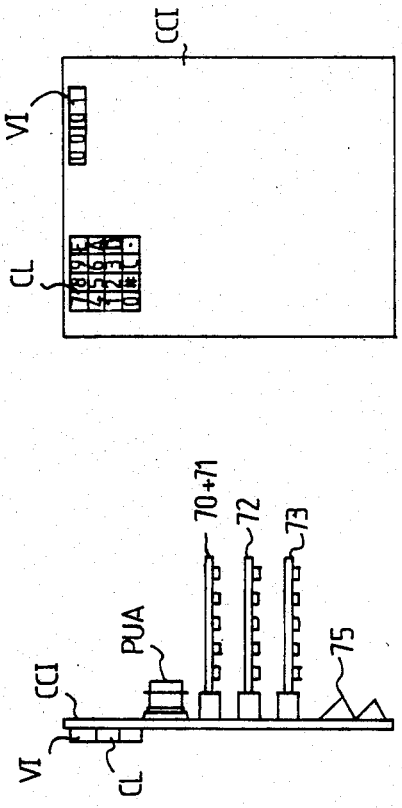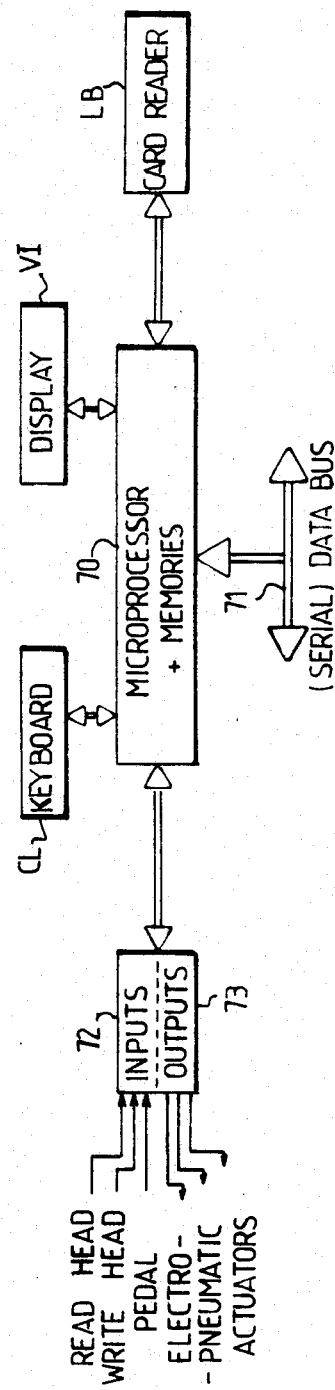

MODULAR INSTALLATION FOR ASSEMBLING AND/OR MACHINING PARTS, WITH WORK STATIONS INCLUDING KEYBOARD-DISPLAY DEVICES

The invention relates to installations of modular structure for manually and/or automatically assembling and/or machining parts.

BACKGROUND OF THE INVENTION

The Applicants have already described modular structure installations having a plurality of work stations for assembling and/or machining parts. These installations are described in French patent application No. 80 21976 filed Oct. 14, 1980 and published under the French Pat. No. 2 491 897, in French certificate of addition application No. 81 07088 filed Apr. 8, 1981, and in U.S. Pat. No. 4,519,491 filed Oct. 14, 1981.

These modular and flexible installations for assembling and/or machining are particularly advantageous for short manufacturing runs. In particular, the user may be any moment alter the structure of the installation to optimize its performance as a function of changing needs.

The modular installations described in the above-mentioned patent applications include a conveyor circuit for moving part-carrying pallets. The conveyor circuit serves a succession of work stations for manual and/or automatic assembly and/or machining. The work stations may be associated with the circuit in series and/or in parallel. The Applicants have already described means for providing each pallet with modifiably encoded data.

Each work station then includes means located upstream from the place where the work proper is performed for reading said encoded data, and/or means located downstream therefrom for writing new data (eg. a destination code) on a pallet carrying a part which has been worked on in a manner that was determined by the code initially read from the pallet.

Such encoding makes it possible for data processing means to control the routing of the pallets throughout an installation. However, serious practical difficulties are encountered. Firstly, there is a considerable volume of data to be processed. Secondly, the data processing means must be made compatible with the evolving and modular characteristics of the installation. Finally, it is desirable that the data processing means should be as easily adaptable to each particular application as are the various modules which make up the installation.

Preferred implementations of the present invention provide a satisfactory solution to the above requirements.

SUMMARY OF THE INVENTION

The present invention provides an installation for performing defined operations such as assembling and/or machining parts, the installation being of the type comprising a plurality of manual and/or automatic work stations each equipped for performing at least one of said operations, said work stations being served by a closed loop main conveyor circuit with each work station being connected in series or in parallel on said circuit, said circuit serving to convey partcarrying pallets fitted with means for encoding modifiable data, each work station including read means located upstream from its work position and write means located at its work position or downstream therefrom, said read means being suitable for reading said data code and said write means being suitable for changing said encoded data, the improvement wherein each work station includes a local data processor unit including memory and an input/output interface suitable for connection to sensors and/or actuators for performing one or more successive operations at the work position of the said work station, the said memory including at least one correspondance table constituted by pairs of pallet codes, the first code of each pair being a code for authorizing a pallet bearing the code to enter the work station to have an operation performed thereon corresponding to the said code, and the second code of each pair being normally given to a pallet bearing the first code after the said corresponding operation has been performed thereon, the memories of the various work stations of the installation having respective correspondance tables suitable for causing the parts carried by the pallets to be subjected to at least one predetermined sequence of operations up to an outlet station from which said parts leave the installation.

In one implementation, some specific work stations suitable for performing the same tasks, and in particular parallel-connected work stations, are associated with memories having correspondance tables that do not include any pairs of codes in common for at least one of the said predetermined sequences of operations; said pairs of codes for said specific work stations being linked with the pairs of codes attributed to other work stations in the installation in such a manner that each of said specific work stations operates on an identifiable respective subset of the pallets in the installation, thereby making it possible to ensure that when a given part needs to be subjected to repeated operations by a work station, the given part is always returned to the same work station for said work.

In a preferred embodiment, each local processor unit is associated with a keyboard-display device connected thereto, and possesses at least one write state enabling data to be entered into said correspondance table, the normal working state of said keyboard-display device being to display a pair of codes relative to the pallet currently in the work position of the work station.

The keyboard-display devices of at least the parallel-connected work stations may possess a second write state for entering the maximum number of pallets simultaneously admissible in the shunt path. Preferably, the pallets retain the same absolute orientation as they move round the conveyor loop, and each keyboard-display device possesses a third write state for entering a code designating the portion of the main conveyor loop in which the work station is located, thereby enabling the work station read means and write means to transpose the codes read from and written to the pallets as a function of the orientation of the pallets relative to the said portion of the main conveyor loop in which the work station is located.

With particular reference to the manual stations (at least), the keyboard-display devices advantageously include a fourth write state for entering a reference code designating the product on which work is to be performed or the specific operation to be performed on said product as a function of the pallet admission code, said data being stored in a second correspondance table, and means being provided for selecting at will either a display of the admission and destination codes of a pallet being worked-on, or else a display of the said reference code.

At least one of the said keyboard-display data processor units may include a connector enabling a second or auxiliary keyboard-display device to be optionally connected within reach of a work station operator, said second keyboard-display device enabling the destination code of a pallet to be set manually, or enabling the displayed data to be temporarily changed.

The processor unit may be capable of memorizing the number and the nature of the operations that are performed in the associated work station, and wherein a specific display state is provided under the control of a connected auxiliary keyboard-display device to display the work that has been done and/or the work that remains to be done, as a function of the said memorized data concerning the number and the nature of the operations performed.

Finally, the various local data processor units may be suitable for connection to an optional link bus for interconnecting all the work stations to a centralized conversational data processor unit serving to monitor the flow of pallets and to provide remote manual and/or automatic programming of the local data processor units, thereby enabling changes to be made in the parallel/series nature of a work station's connection in the main conveyor loop, the admission and destination code pairs, and/or in the number of pallets simultaneously admissible in a work station.

BRIEF DESCRIPTION OF THE DRAWINGS

An embodiment of the invention is described by way of example with reference to the accompanying drawings, in which:

FIG. 10 is an electrical block diagram of the elements included in a processor unit including the keyboard-display device, and FIGS. 11A to 11C are diagrams showing the mechanical installation thereof.

MORE DETAILED DESCRIPTION

Reference should be made to the above-mentioned published French patent applications and its certificate of addition for a detailed description of the essentially mechanical nature of a modular installation for assembling and/or machining parts. Reference can also be made to the Applicants' European patent application No. 81 401 587.1, published under No. 50 080.

Figure 1:
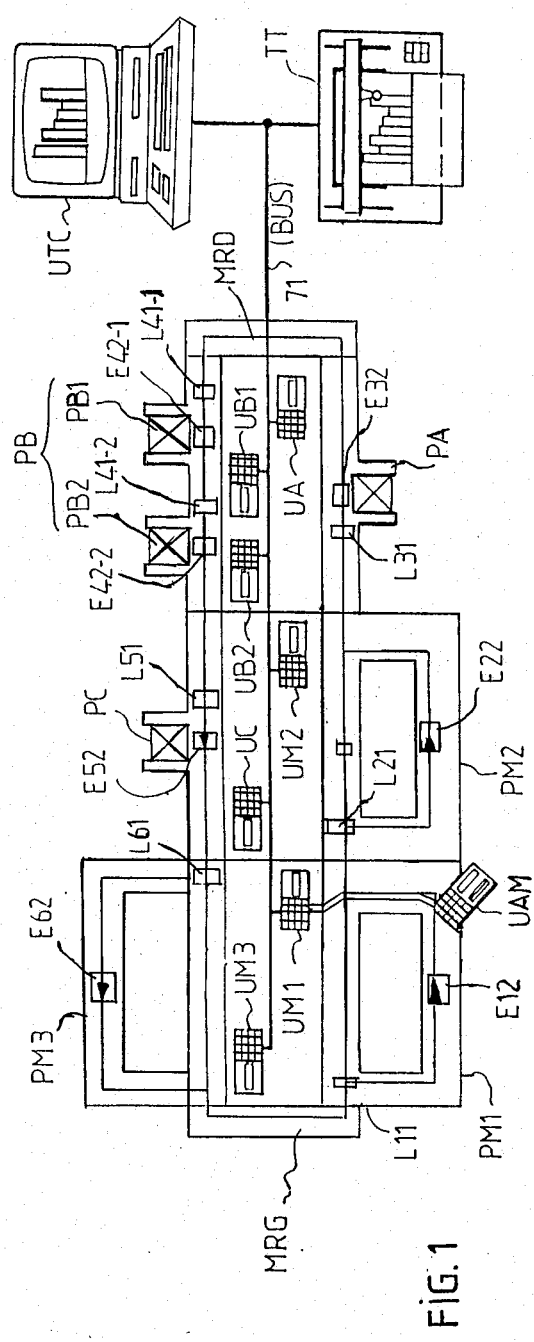
FIG. 1 is a diagrammatic plan showing the principles of operation of a particular example of an installation in accordance with the present invention.
Figure 2:
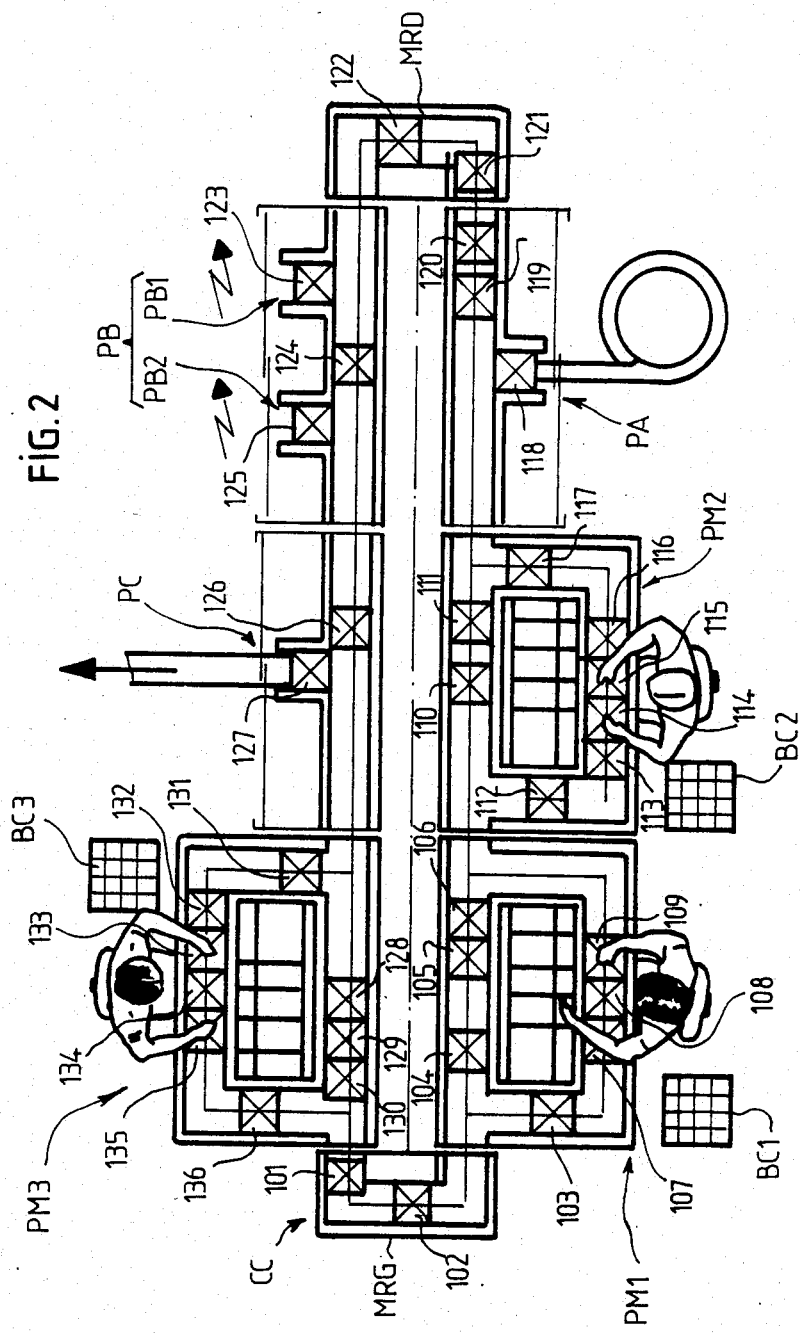
FIG. 2 is a plan similar to FIG. 1, but drawn differently to clarify different means used in accordance with present invention.

Reference is now made to FIGS. 1 and 2. The installation shown includes a main, closed-loop conveyor circuit having an overall reference CC. The circuit is defined by a series of modules disposed along two lines, and interconnected by end modules referenced MRG and MRD. Starting from the right hand end module MRG, and going along the lower line in the figures, there are two manual modules referenced PM1 and PM2 each having a parallel or shunt circuit. Then there is an automatic module PA connected in series in the circuit and having a booth adjacent to the main circuit in which the work is actually performed. Thereafter, the second or right hand end module MRD moves the work to the upper line of the main loop (again the terms "left" and "right" and "upper" and "lower" refer to the orientation of the figures as drawn). There is then a module PB having two booths PB1 and PB2 for performing two similar automatic operations in a manner which is described below. The module PB is followed by a single booth automatic module PC. Finally, the loop is closed by a manual module PM3 which is shunt connected. The outlet from the module PM3 feeds the inlet to the right hand end module MRG, thus closing the loop. Various part-carrying pallets 100 to 136 are shown at different positions on the circuit. Although a special module could be provided specially for the purpose, it is assumed in the present example that the parts are applied to the pallets at one of the manual modules, e.g. the module PM1.

By way of concrete example, it is supposed that the installation shown is being used for a phase in the assembly of an electrical switch. The modules PM1, PM2 and PM3 define manual work stations where respective operators insert a component in the switch. The operators take the components from respective trays BC1 to BC3. The automatic single booth station PA then fixes the said component, e.g. by crimping. Since it operates at a high speed, one automatic machine can serve several manual work stations. The automatic module PB is provided with two booths to enable it to perform electrical test which require more time than the crimping operation.

Finally, the single booth automatic module PC serves as an output station.

Each of the part-carrying pallets 100 to 136 is provided with a medium for carrying modifiable coded data. For example, the data may be encoded on six pegs each capable of taking up two different positions. This corresponds to a six-bit code which can be associated with binary values 0 to 63. Each work station, e.g. the manual station PM1, includes an upstream reader unit L11 for reading the positions of the pegs on a pallet as it enters the module. Downstream from the position at which the work is actually performed in the module (i.e. downstream from the operator position in the present example), each module is equipped with a write unit E12 suitable for writing a new destination code on a pallet. In the present example the pallet 108 is carrying a part which is being operated on in a manner defined by the code read at L11, the new code being written on the pallet defines the next operation to be perform on the part. Similarly, the station PM2 is associated with a read unit L21 and a write unit E22; the station PA has a read unit L31 and the write unit E32, the station PB1 has a read unit L41-1 and a write unit E42-1, the station PB2 has a read unit L41-2 and a write unit E42-2, the station PC has a read unit L51 and a write unit L52, and finally the station PM3 has a read unit L61 and a write unit E62. Such read and write unit is systematically installed in association with each position at which work may be performed in the various modules. It is thus possible that some of the read and or write units will remain unused in certain configurations of the installation.

Each work station is associated with a keyboard-display device referenced UM1, UM2, UA, UE, UB2, UC or UM3 respectively for the work stations PM1, PM2, PA, PB1, PB2, PC or PM3. Each keyboard-display device is interconnected with a local data processing unit which includes storage and an input/output interface. These data processing means are preferably incorporated in the same housing as the keyboard-display device. In FIG. 1, the various keyboard-display devices have been drawn in the central well of the main circuit CC. Generally speaking they are positioned in such a manner that at least the keyboard portion is not accessible in normal service, while the display portion is visible under all circumstances. There is also an auxiliary keyboard-display device UAM connected to the keyboard-display device UM1 of the station PM1.

Figure 7:
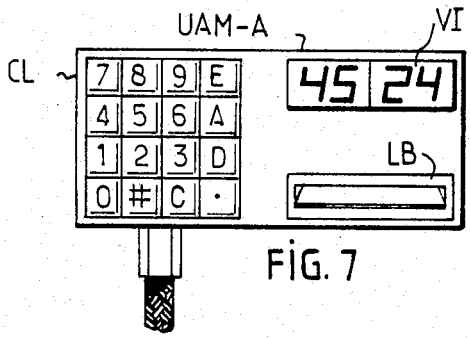
Figure 8:
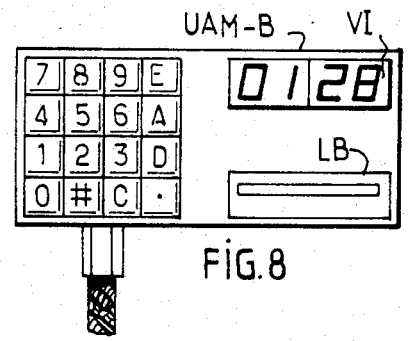

In FIGS. 3 to 8 the reference CL designates the keyboard portion of the device and the reference VI designates the display portion. FIGS. 3, 4, 5 and 6 show, by way of example, the keyboard-display device of the manual station PM1 in four different states identified by the suffixes A to D. FIGS. 7 and 8 show the auxiliary keyboard-display device UAM which is associated with the manual station PM1 and which is equipped with a card reader LB. If desired, all of the keyboard-display devices could be equipped with respective card readers.

FIG. 10 is a block diagram of a keyboard-display device. The processor unit 70 is constituted by a microprocessor together with associated memory circuits which may either be incorporated on the same integrated circuit as the microprocessor itself or which may be constituted by additional integrated circuits mounted on the same printed circuit board.

The microprocessor is also connected to an input interface 72 and an output interface 73, thereby enabling it to take account of all the data necessary for proper operation of the associated module and also enabling it to issue the necessary commands. The input interface 72 is connected to the read head L11, and to a pedal (not shown) for operation by the operator to indicate that a particular operation has been terminated on the part-carrying pallet 108. The output interface 73 is connected to the read head E12 and to various output devices, e.g. electropneumatic actuators for switching incoming pallets either along the main loop 104 or round the shunt path 103. Similar switching operations are performed to return a pallet to the main path.

Preferably, the microprocessor 70 of each of the keyboard-display devices is further connected to a series data transfer bus 71. The bus 71 serves to interconnect all of the keyboard-display devices to one another and to a microprocessor UTC shown in FIG. 1 and which serves to centralize various data concerning the operation of the installation as a whole.

FIGS. 11A, 11B and 11C show a highly compact example of a keyboard-display unit housed together with the associated processing means. A printed circuit mother board CC1 has a connector PUA on its inside surface for connection to an auxiliary keyboard-display unit such as UAM, together with connectors for the following plug-in circuits as required:

An upper card 70+71 for the microprocessor, its memory circuits, and the bus link;

A middle card 72 for the input interface; and

A lower card 73 for the output interface.

Connection strips 75 are used for electrical connections.

On the outside, the top of the mother board CCl supports the keyboard CL and the display VI in a position which is highly visible but inaccessible in normal operation.

When there is an auxiliary keyboard-display device, a card reader LB is also provided (in a variant, a card reader could be provided with the main keyboard-display units, but then they would have to be accessible).

At each work station, the associated microprocessor 70 includes at least two correspondence tables in its memory, these tables are referred to as TAB 1 and TAB 2. The microprocessor also includes in program memory the data required for performing a flowchart of the type shown in FIG. 12, and if a card reader is provided, it further includes a program for performing the flowchart shown in FIG. 13.

Reference is now made to the operations to be performed when a new arrangement of modules is brought into service or when an existing installation is updated. After the modules have been suitably located physically, a specialized operator uses the various keyboard-display devices to set up the operational and dynamic characteristics of each work station.

FIGS. 3 to 6 show the keyboard CL in a conventional arrangement of ten numerical keys numbered 0 to 9, a decimal point key, a correction key marked C, and an information key marked #. Further, the keyboard includes a key E for writing in the microprocessor memory, in a manner that is explained below, a key A for returning to normal mode, in particular following write mode, and a key D for stepping through the contents of the memories associated with the microprocessor one step at a time.

Figure 3:
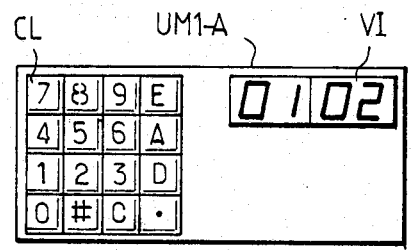
FIGS. 3 to 8 show a keyboard-display device as used in the present invention in six different display situations.

Using the work station PM1 as an example, the operator who sets up the work station begins by pressing the write key, and then by keying in 01 followed by 02 followed by the confirmation key (FIG. 3). The pair of codes 01, 02 is inserted into the table TAB 1 by the microprocessor 70, and indicates that pallets at the inlet to the work station and having the code 01 are suitable for taking the shunt path through the work station PM1 for being subjected to the corresponding operation, and then having their code changed to 02 by the write unit E12 thus preparing them to be operated on in a subsequent work station.

Figure 4:
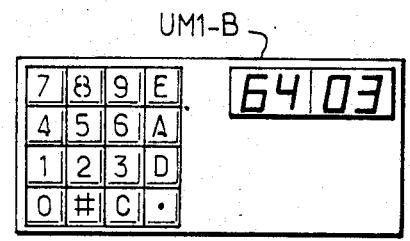

Admission of a pallet to a particular post may be subjected to other conditions. For example in a shunt work station, the operator may again press the key E followed by the code 64 and data 03 followed by confirmation (FIG. 4). The code 64 (i.e. outside the range of possible pallet codes 0–63) is chosen arbitrarily to indicate that the accompanying number (i.e.; three in this case) is the number of pallets which may be admitted to the shunt path of work station PM1 at any one time. Two features are thus defined concerning the operations which can be performed by the station PM1: firstly a code is defined for identifying pallets suitable for being worked on by the work station together with a code indicative of pallets that have been worked on; and secondly a feature of the dynamic behavior of the work station M1 is defined, namely the number of pallets which it can admit on its shunt path.

A pair of codes suffice to make the installation operational, but the invention extends much further than that as is explained below.

Figure 5:
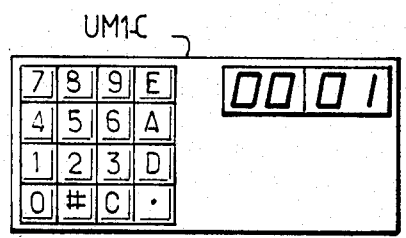
Figure 6:
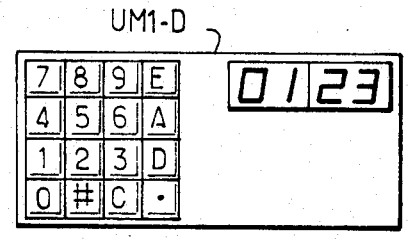

Before going any further it is mentioned that the pallets generally retain the same orientation all the way round the closed loop. The invention therefore advantageously includes the possibility of inserting a binary value 00 or 01 after a suitable special code 100 for indicating whether a particular station is on the upper or the lower line of the closed circuit CC (FIG. 5). This considerably simplifies the interpretation of the codes being read by the processor unit concerned.

In practice, the operator of a manual work station such as PM1 will perform several operations on the same product after the product has performed one or more trips round the main circuit CC. The operator could also perform slightly different operations on a special product as will be explained below.

In the case of successive operations being performed on the same product, the work station PM1 may be set up to work between several pairs of codes such as 01/02, 03/04 and 05/06, for example.

The manual station PM2 may be set up to work between code pairs 07/08, 09/10 and 11/12. The automatic work station PA may be set up to work between code pairs 02/03, 08/09, and 14/15. Both of the automatic work stations PB1 and PB2 have the same pairs of codes associated therewith, namely 04/05, 10/11, and 16/17. The automatic station PC which serves as an output station receives code pairs 06/01, 12/07 and 18/13. Finally, the manual station PM3 receives code pairs 13/14, 15/16 and 17/18.

After these setting up operations, the keys A on the various keyboards are pressed in order to return the keyboard-display devices to normal mode.

Figure 9:
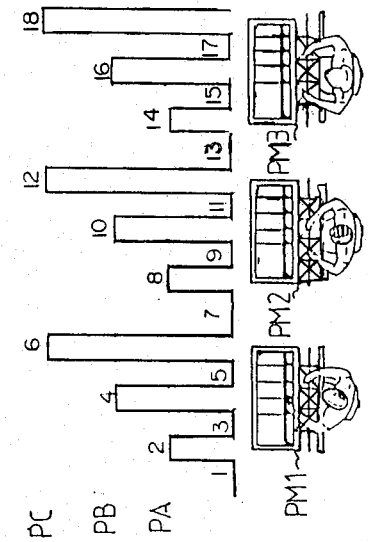
FIG. 9 is a bar chart showing the operation of manual work stations PM1 to PM3.

FIG. 9 shows the path of the pallets between the various manual stations PM1 to PM3 and the automatic stations PA, PB and PC in the above example.

It can be seen, in accordance with an important aspect of the present invention, that a given pallet always returns the same manual station and the operator of that station thus performs all the manual operations on the product carried by that particular pallet.

Naturally, for each station, the memories can store a plurality of operational sequences corresponding to similar products or even different products which can be produced at the same time or successively as may be required.

It will be noticed that the two equivalent automatic work stations PB1 and PB2 have identical code pairs (at least for a given sequence of operations). Conversely, the three equivalent manual work stations do not share any code pairs in common (for the sequence of operations given in FIG. 9). It can thus be said that the manual work stations are working in a closed loop on respective sets of pallets as is shown by the consecutive code pairs attributed to each of them, e.g. 01/02, 03/04 and 05/06 for the work station PM1. In contrast, the automatic stations are working in an open loop and may work on any of the pallets.

Thus, the output work station PC "closes" the above-mentioned loops by means of its code pairs 06/01, 12/07 and 18/13.

At each work station, the normal display mode consists of displaying the input code in the corresponding display unit VI, e.g. 01 for the pallet at the work position within the work station (e.g. pallet 108 in work station PM1), next to an output code (e.g. 02) which will be attributed to the pallet when the manual operation has been completed. Thus, staying with the station PM1, the pallet 109 has just been worked on by the operator who has pressed on the pedal so that the write unit E12 changes the code on the pallet 109 to 02. Each work station is thus permanently equipped with a large display that indicates in real time which operations are being performed.

The above description associates a plurality of operation codes with each work station. In manual stations this may require too high a level of concentration on the part of the operator, e.g. when some parts in some special switches require special actions to be taken.

In this case, for at least some of the keyboard-display devices and for some at least of the admission codes attributed thereto, some other form of code may be recorded as corresponding to respective ones of the admission codes. For example, instead of an arbitrary admission code, the corresponding code which is displayed may constitute the reference number for the product conveyed on the incoming pallet, or a reference number for the specific operation to be performed thereon.

This arrangement is described with reference to the setting up stage for the installation. When the admission codes are inserted in the table TAB 1, the key E is pressed a further time followed by a special code, e.g. 99, which causes the microprocessor 70 to access a second table TAB2. The natural operation code, e.g. 01 is made to correspond in Table TAB 2 with a specific digital code, e.g. 23 or alphanumeric code to given the operator a better understanding of the operations to be performed on the pallet (display 01/23 on FIG. 6).

Figure 12:
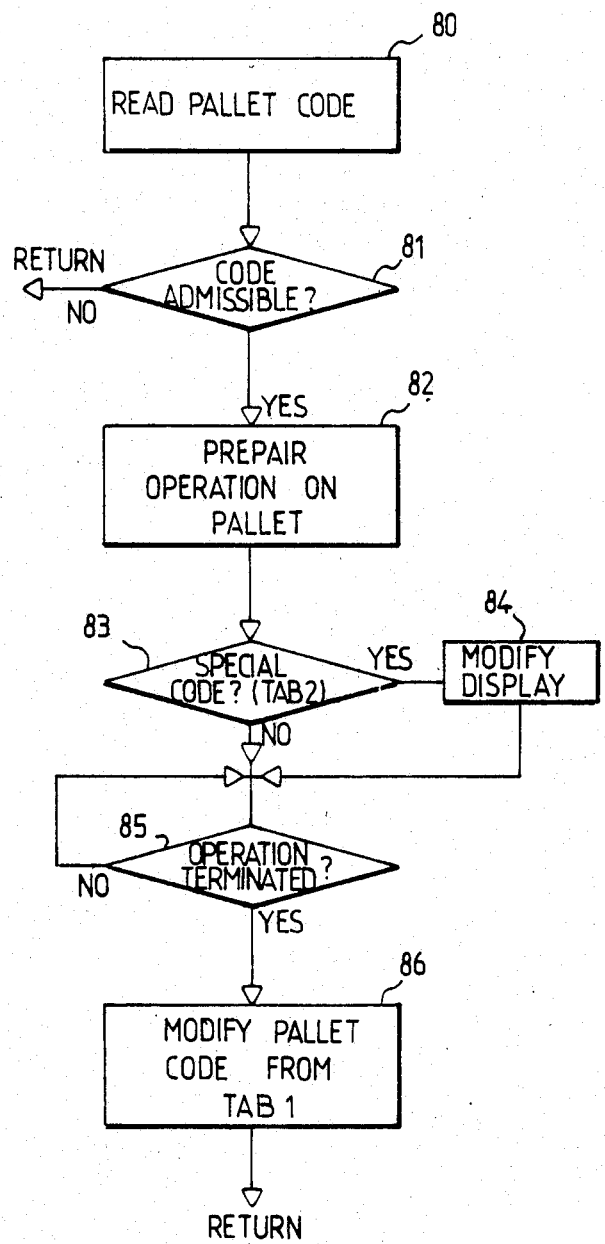
FIGS. 12 and 13 are two flowcharts showing the main principles of keyboard-display device operation and of processor unit operation.

Reference is now made to FIG. 12 which is a flowchart showing the operations performed by the microprocessor 70 associated with the work station P1 for example when a code is read by the read unit L11 (stage 80 in FIG. 12). The test at 81 determines whether the code as read is suitable for admission on the shunt path, and also whether the shunt path is not already fully occupied with three pallets. If the pallet is admissible stage 82 follows in which the passage of the pallet along the shunt path is recorded, and the station PM1 is activated for the operation to be performed on the pallet. Test 83 determines whether the operation in question has a special code attributed thereto in the Table TAB2, in which case stage 84 is performed for modifying the display so that instead of displaying the natural sequence of operations (e.g. 01/02), it displays a special code attributed to the operation to be performed as recorded in Table TAB2. This operation of displaying a code from the Table TAB2 may optionally be at the specific request of the operator. Regardless of whether a special code is to be displayed or not, the next stage is stage 85 in which a test is performed to see whether the work has been done, which in the present case is indicated by the operator pressing on a pedal. Once the work has been done, stage 86 actuates the write unit E12 to modify the pallet code in accordance with contents of Table TAB 1. If the test 81 gives a NO answer, or after the end of stage 86, the microprocessor 70 returns to the task of monitoring the work station PM1 as a whole, including both its main path and its shunt path.

The data processing device stores the number and the nature of the operations performed in each work station in the memory. Preferably, this task is performed by the local processor unit 70 which thus stores the number and the nature of the operations performed in the work station in which it is fitted. A specific corresponding display state is provided for the relevant keyboard-display device (i.e. the device associated with the work station in question) and, in this specific state the keyboard-display device indicates the work accomplished and/or the work remaining to be done on the basis of data stored therein.

This may be done by interrogation from the keyboard using a special code which changes from the normal display mode (pallet inlet code, pallet outlet code) to a display mode indicating the number of parts on which work has been performed or else the number of parts on which work remains to be performed in a given period of time.

Preferably, this function is realized by means of the card reader and an auxiliary keyboard-display unit such as UAM, at least at the manual work stations. The data stored concerning the work performed and/or to be done is then together with the identity of the operator (or in the case of an automatic work station together with the identity of the particular operation performed).

The operator may simply insert a card at the beginning of a work session and remove it at the end, which operation may be accompanied by a temporary display of the number of part that have been worked on and of the number of parts that remain to be worked on, these numbers may be displayed together or one after the other.

A preferred variant consists in leaving the card in the card reader so long as the operator is at work. From time to time the operator may press on the card thereby modifying the display, for example changing the display from inlet and outlet codes to a display indicating the quantities of work done and/or to be done.

At the same time, the associated processor unit uses its internal clock to measure the time the operator is at work and to associate this time with the number of completed parts.

All this data is transmitted via the bus 50 to the microcomputer UTC which performs overall measurement. The microcomputer UTC uses this data to generate, for example, work-rate histograms as is shown in the display of FIG. 1. It thus performs performs overall management of the installation as a whole. Further, by observing the rate at which the various operations are performed, the speed of pallet circulation may be optimized since the statistical data available to the microcomputer UTC make it possible to adjust at will the main parameters of installation operation, by extremely simple means using various keyboard-display devices.

Figure 13:
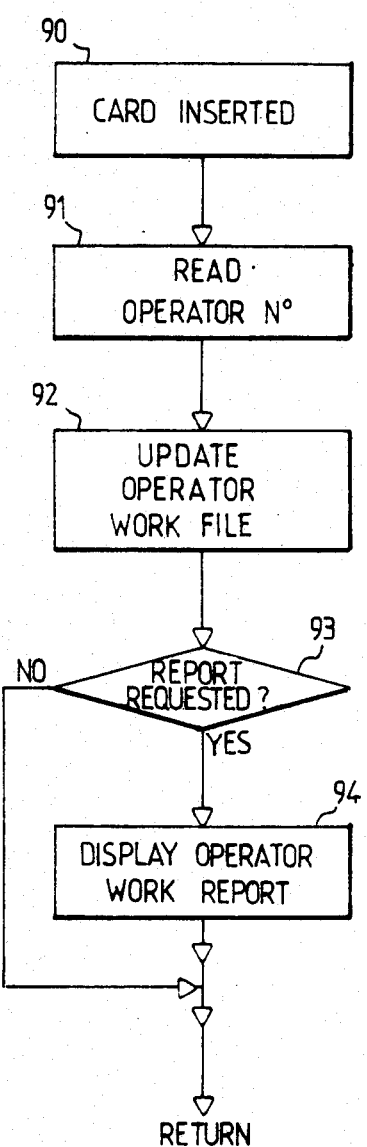

Reference is now made to FIG. 13 which is a flowchart given by way of example to show how the above-described operations may be achieved.

The flowchart starts with stage 90 at which the card is inserted into the card reader (see FIG. 7). The word reader then acquires the operator number by means known per se as encoded on the card (stage 91). The following stage 92 consists in the microcompressor updating an operator file which may simply be constituted by continuing a pre-existing file associated with this particular operator bus.

A test 93 then determines whether a report has been requested, e.g. by the operator. This test may correspond to various types of physical action, e.g. either the card is pressed into the reader during a working session, or else a specific pushbutton is pressed by the operator, or else some other equivalent means are actuated.

After the test 93, stage 94 displays, when required, the number of parts worked on by the operator and possibly also the number of parts that remain to be worked on, with these two displays being performed either together or in sequence depending on the size of the data to be displayed.

The microprocessor then returns to normal operation. In this respect, the persons skilled in the art will understand that the flowcharts given in FIGS. 12 and 13 may be realized by means of priority interrupts on the main program for each microprocessor 70 in each work station.

Reference is now made to FIG. 1 on which it can be seen that the keyboard-display device UM1 is connected to a small auxiliary keyboard-display device UAM.

Such an auxiliary keyboard is used advantageously in some work stations for which it is desirable to modify the destination code of the part-carrying pallet in a manner chosen by the operator. This arises in particular at work stations associated with quality control operators whose job is to determine whether a part, e.g. a switch, is acceptable and may therefore be output via the output station PC with the empty pallet then being returned to its intial code (e.g. 01 for work station PM1) by the write unit E52. If a part fails the quality control inspection, it may either be thrown away, or else it may be serviced to bring it up to standard. Under such circumstances, the quality control operator uses the keyboard-display device UAM to cause the appropriate destination code to be used (e.g. 01/2B, FIG. 8).

It can now be understood how the present invention makes an installation very flexible. The invention makes it possible to define both the parameters of part dynamics and the parameters of the operations to be performed at the various work stations, together with the possibility of performing a certain number of different operations at the same work stations, in particular at manual work stations. The operator task is simplified in the event of unusual work since it can be marked with a special code. Furthermore, it is possible to perform centralized management of the installation as a whole. In spite of all that, the operators are very free in organizing their work time and can at any moment have a display of the work they have already done and the work that remains to be done. Furthermore, and especially, in the preferred embodiment described above, each operator has the satisfaction of personalized work: all the manual operations to be performed on a particular part are performed by the same operator.

In this respect, it may be noted that such personalized work stations may be automatic work stations in some applications. Further, teams of personalized work stations may be set up to work on a given lot of pallets, at least for a given sequence of operations. Finally, for the same tasks it is possible to make personalized work stations with work stations that are not personalized, e.g. for operator training.

Naturally, the means of the present invention may be used to insert numerous other parameters when the installation is being set up, in particular parameters for defining the rate at which parts are expected to flow through the various work stations. Likewise, variations are possible within the arrangements described. For example, the report of work done or work remaining to be done may be displayed at each work station on command from the microcomputer UTC.

What is claimed is:

1. A modular flexible manufacturing installation, comprising:
    (a) a closed loop main conveyor, adapted to convey part-carrying pallets each comprising means for encoding modifiable data; and (b) a plurality of work stations, each adapted to exchange pallets with said main conveyor, wherein said plurality of work stations comprise:
  (i) a plurality of automatic work stations for performing an automatic manufacturing task on the part or parts carried by each pallet; and
  (ii) a plurality of manual work stations adapted to enable an operator to perform a manual manufacturing task on the part or parts carried by each pallet,
wherein some of said work stations have direct access to said main conveyor, wherein other of said work stations comprise an auxiliary conveyor disposed parallel to said main conveyor, wherein said other of said work stations comprises manual work stations,
wherein each work station comprises:
  (i) read means for reading a pallet data code on said pallets before performing said manufacturing task on said pallet;
  (ii) means for indicating that said manufacturing task in completed;
  (iii) write means for changing said pallet data code after said manufacturing task has been performed; and
  (iv) a local data processor unit comprising:
    (a) an input/output interface connected to said read means, said indicating means, and said write means of said work station; and
    (b) memory means containing a table of pairs of pallet data codes, each pair of codes comprising an admission code identifying a pallet authorized for processing in said work station, and a destination code to be given to said pallets after said manufacturing task at said work station has been completed for identifying the destination of said pallet to another work station,
wherein parts carried by said pallets are subjected to a predetermined sequence of manufacturing tasks before reaching an outlet station in response to the instructions contained in the tables of said memories of said local data processor units of said plurality of work stations.

2. An installation according to claim 1 wherein only said local data processor units contain said tables of said pairs of pallet data codes.

3. An installation according to claim 1, wherein each local processor unit is associated with a keyboard-display device connected thereto, and possesses at least one write condition enabling data to be entered from the keyboard into said correspondence table, the normal working state of said keyboard-display device being to display a pair of codes relative to the pallet being currently in the work position of the work station.

4. An installation according to claim 3, wherein the keyboard-display devices of at least the work stations having an auxiliary conveyor possess a second write condition for entering the maximum number of pallets simultaneously admissible in the auxiliary conveyor.

5. An installation according to claim 4, wherein the pallets retain the same absolute orientation as they move around the closed loop of said main conveyor, and wherein each keyboard-display device possesses a third write condition for entering a code designating the portion of the main conveyor loop on which the work station is located, thereby enabling the work station read means and write means to reverse the codes read from and written to the pallets as a function of the orientation of the pallets relative to the said portion of the main conveyor loop in which the work station is located.

6. An installation according to claim 5, wherein the keyboard-display devices, at least of the manual work stations, possess a fourth write condition for entering a reference code designating the product on which work is to be performed or the specific operation to be performed on said product as a function of the pallet admission code, said data being stored in a second correspondence table, wherein said installation further comprises means for selecting at will either a display of the admission and destination codes of a pallet being worked-on, or a display of the said reference code.

7. An installation according to claim 3, wherein said keyboard-display devices are located in their respective work stations in such a manner as to render the keyboard inaccessible in normal operation, while leaving the display visible under all circumstances.

8. An installation according to claim 3, wherein at least one of the said local data processor units includes a connector enabling a second keyboard-display device to be optionally connected within reach of a work station operator, said second keyboard-display device enabling the destination code of a pallet to be set manually, or enabling the displayed data to be temporarily changed.

9. An installation according to claim 8, wherein the local data processor unit is capable of memorizing data relating to the number and the nature of the manufacturing tasks that are performed in its associated work station, and wherein a specific display condition is provided under the control of a connected second keyboard display device to display information concerning the current work status of the working station, as a function of the said memorized data.

10. An installation according to claim 1, wherein said local data processor units are adapted to be connected to an optional link bus for interconnecting all the work stations to a centralized conversational data processor unit serving to monitor the flow of pallets and to provide remote programming of the local data processor units.

11. An installation according to claim 1, comprising redundant work stations, adapted to perform the same manufacturing task, the respective memories of the local data processing units of said redundant work stations having no pair of codes in common with each other, and the pairs of codes of any one of the redundant work station being so linked with the pairs of codes of the remaining work stations, that the corresponding pallet always returns to the same redundant work station.

12. An installation according to claim 11, wherein said redundant work stations are work stations having an auxiliary conveyor.

13. An installation according to claim 12, wherein said redundant work stations are manual work stations.

* * * * *

UNITED STATES PATENT AND TRADEMARK OFFICE
CERTIFICATE OF CORRECTION

PATENT NO. : 4,646,245

DATED : February 24, 1987

INVENTOR(S) : Maurice PRODEL et al.

It is certified that error appears in the above-identified patent and that said Letters Patent is hereby corrected as shown below:

Column 2, line 53, change "in" to ---on---.
    Column 4, line 35, change "test" to ---tests---.
    Column 1, line 65, change "partcarrying" to ---part-carrying---.
    Column 9, line 38, delete "performs (second occurrence).
    Column 9, line 53, change "microcompressor" to ---microprocessor---.
    Column 11, line 22, change "in" to ---is---.

Signed and Sealed this

Twenty-sixth Day of November, 1991

Attest:

HARRY F. MANBECK, JR.

*Attesting Officer*      *Commissioner of Patents and Trademarks*